(12) United States Patent
Lin

(10) Patent No.: US 10,773,560 B2
(45) Date of Patent: Sep. 15, 2020

(54) SYSTEM FOR AN AIR MAINTENANCE TIRE ASSEMBLY

(71) Applicant: The Goodyear Tire & Rubber Company, Akron, OH (US)

(72) Inventor: Cheng-Hsiung Lin, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 457 days.

(21) Appl. No.: 15/447,160

(22) Filed: Mar. 2, 2017

(65) Prior Publication Data

US 2017/0174017 A1 Jun. 22, 2017

Related U.S. Application Data

(63) Continuation of application No. 14/269,294, filed on May 5, 2014, now Pat. No. 9,809,066.

(51) Int. Cl.
*B60C 23/12* (2006.01)

(52) U.S. Cl.
CPC .................................. *B60C 23/126* (2020.05)

(58) Field of Classification Search
CPC ............................. B60C 23/12; B60C 23/126
See application file for complete search history.

(56) References Cited

U.S. PATENT DOCUMENTS

| | | | |
|---|---|---|---|
| 4,349,064 A * | 9/1982 | Booth | B60C 23/12 152/418 |
| 4,651,792 A | 3/1987 | Taylor | |
| 5,201,968 A * | 4/1993 | Renier | B60C 23/12 152/415 |
| 5,556,489 A * | 9/1996 | Curlett | B60C 23/12 152/418 |
| 5,707,215 A | 1/1998 | Olney et al. | |
| 6,691,754 B1 | 2/2004 | Moore | |
| 7,051,778 B2 | 5/2006 | Mancosu et al. | |
| 7,322,395 B2 | 1/2008 | Hawes | |
| 8,113,254 B2 | 2/2012 | Benedict | |
| 8,186,402 B2 | 5/2012 | Eigenbrode | |
| 8,534,335 B2 | 9/2013 | Benedict | |
| 8,807,182 B2 | 8/2014 | Kelly | |
| 8,960,249 B2 | 2/2015 | Lin | |
| 9,114,674 B2 | 8/2015 | Hall | |
| 9,151,288 B2 | 10/2015 | Richardson et al. | |
| 9,222,473 B2 | 12/2015 | Richardson | |

(Continued)

FOREIGN PATENT DOCUMENTS

EP 0855294 A3 12/1999

OTHER PUBLICATIONS

European Search Report dated May 30, 2017 for Application Serial No. EP17156910.

*Primary Examiner* — Kip T Kotter
(74) *Attorney, Agent, or Firm* — Robert N. Lipcsik

(57) ABSTRACT

A system is used with a pneumatic tire mounted on a wheel rim to keep the pneumatic tire from becoming underinflated. The first system includes a plurality of pumps attached circumferentially to the wheel rim, each pump having pump parameters, and a control valve for controlling inlet air into a tire cavity of the pneumatic tire. The control valve has valve parameters. The system predicts system performance under various configurations and conditions through use of the pump parameters and the valve parameters.

10 Claims, 8 Drawing Sheets

(56) References Cited

U.S. PATENT DOCUMENTS

| | | |
|---|---|---|
| 9,409,454 B2 | 8/2016 | Middelberg |
| 9,505,278 B1 | 11/2016 | Gau et al. |
| 2010/0282388 A1 | 11/2010 | Kelly |
| 2014/0023518 A1 | 1/2014 | O'Brien et al. |
| 2014/0366957 A1 | 12/2014 | Wang et al. |
| 2015/0147198 A1 | 5/2015 | Chawla et al. |
| 2015/0147199 A1 | 5/2015 | Chawla et al. |
| 2015/0314657 A1 | 11/2015 | Lin |
| 2017/0015148 A1 | 1/2017 | Serret Avila et al. |

\* cited by examiner

SYSTEM FOR AN AIR MAINTENANCE TIRE ASSEMBLY

FIELD OF THE INVENTION

The present invention relates to a system and method for maintaining appropriate air pressure within a pneumatic tire. More specifically, the present invention relates to a rim mounted system for directing air into a tire cavity of a pneumatic tire.

BACKGROUND OF THE INVENTION

Conventional pneumatic tires are designed to perform for relatively long periods of time. In many cases, automobile tires are now expected to have a useful service life of 30,000, 50,000, or 70,000 miles. However, even long-life pneumatic tires are subject to air pressure losses due to puncture by nails and other sharp objects, temperature changes, and/or diffusion of air through the tire itself.

Since air diffusion reduces tire pressure over time, the pneumatic tires are often continually underinflated. Accordingly, drivers must repeatedly act to maintain tire pressures or fuel economy, tire life, and/or vehicle braking and handling performance will be reduced. Tire Pressure Monitoring Systems (TPMS) have been proposed to warn drivers when tire pressure is significantly low. Such systems, however, remain dependent upon a driver taking remedial action, when warned, to re-inflate a tire to the recommended pressure. It is desirable, therefore, to incorporate an air maintenance feature within a pneumatic tire that will maintain recommended air pressure without requiring bothersome driver intervention.

SUMMARY OF THE INVENTION

A first system in accordance with the present invention is used with a pneumatic tire mounted on a wheel rim to keep the pneumatic tire from becoming underinflated. The first system includes a plurality of pumps attached circumferentially to the wheel rim, each pump having pump parameters, and a control valve for controlling inlet air into a tire cavity of the pneumatic tire. The control valve has valve parameters. The system predicts system performance under various configurations and conditions through use of the pump parameters and the valve parameters.

According to another aspect of the first system, the plurality of pumps and the control valve define a multi-chamber pump configuration.

According to still another aspect of the first system, each pump includes one piston placed between two chambers.

According to yet another aspect of the first system, the two chambers are connected by a narrow passage having a one-way check valve.

According to still another aspect of the first system, the plurality of pumps define a force control system with a maximum pumping capability determined by a piston of each pump moving a maximum distance within each pump.

According to yet another aspect of the first system, each pump includes a first diaphragm limiting motion of a piston in a first direction and a second diaphragm limiting motion of the piston in a second opposite direction.

According to still another aspect of the first system, the system is driven by two force a gravitation component and an acceleration component.

According to yet another aspect of the first system, the pump parameters include a piston mass parameter, a first piston travel parameter, and a second piston travel parameter.

A second system in accordance with the present invention models a pneumatic tire mounted on a wheel rim and a pumping mechanism mounted on the wheel rim to keep the pneumatic tire from becoming underinflated. The second system includes a plurality of pumps attached circumferentially to the wheel rim, each pump having pump parameters, and a control valve for controlling inlet air into a tire cavity of the pneumatic tire. The control valve has valve parameters. The second system predicts system performance under various configurations and conditions through use of the pump parameters and the valve parameters.

According to another aspect of the second system, the plurality of pumps and the control valve define a multi-chamber pump configuration.

According to still another aspect of the second system, each pump includes one piston placed between two chambers.

According to yet another aspect of the second system, the two chambers are connected by a narrow passage having a one-way check valve.

According to still another aspect of the second system, the plurality of pumps define a force control system with a maximum pumping capability determined by a piston of each pump moving a maximum distance within each pump.

According to yet another aspect of the second system, each pump includes a first diaphragm limiting motion of a piston in a first direction and a second diaphragm limiting motion of the piston in a second opposite direction.

According to still another aspect of the second system, the system is driven by two force components including a gravitation component and an acceleration component.

According to yet another aspect of the second system, the pump parameters include a piston mass parameter, a first piston travel parameter, and a second piston travel parameter.

A pumping mechanism for use with the present invention is used with a pneumatic tire mounted on a wheel rim to keep the pneumatic tire from becoming underinflated. The pumping mechanism includes a plurality of pumps forming a linear belt and subsequently being attached circumferentially to the wheel rim, a plurality of pump holders interconnecting the plurality of pumps in a linear configuration, and a control valve for controlling inlet air into a tire cavity of the pneumatic tire.

According to another aspect of the pumping mechanism, the pumping mechanism provides a low profile and effective multi-chamber pump system mounted inside the wheel rim with no significant modification to the wheel rim and no modification to pneumatic tire.

According to still another aspect of the pumping mechanism, the pumping mechanism utilizes gravitational force changes during rotation of the pneumatic tire.

According to yet another aspect of the pumping mechanism, each pump includes a piston body moving against a pair of diaphragms.

According to still another aspect of the pumping mechanism, the piston body of each pump travel in a first direction and an opposite second direction per each revolution of the pneumatic tire.

According to yet another aspect of the pumping mechanism, load on the pneumatic tire does not affect frequency of pumping action of the pumping mechanism.

According to still another aspect of the pumping mechanism, the plurality of pumps includes 4 to 10 pumps and 4 to 10 pump holders configured circumferentially on a belt forming a loop and fitting circumferentially within a middle groove of the wheel rim.

According to yet another aspect of the pumping mechanism, the control valve is shaped similarly to the pumps such that the control valve is placed in a space between the beginning and the end of the belt.

According to still another aspect of the pumping mechanism, the pump holders have adjustable lengths that multiple sizes of wheel rim.

According to yet another aspect of the pumping mechanism, the pumping mechanism further includes a filter unit connected in series with the pumps and pump holders.

A pneumatic tire for use with the present invention is mounted to a wheel rim to keep the pneumatic tire from becoming underinflated. The pneumatic tire includes a plurality of pumps forming a linear belt and subsequently being attached in series to the wheel rim, a plurality of pump holders interconnecting the plurality of pumps in a linear configuration, and a control valve for controlling inlet air into a tire cavity of the pneumatic tire. The pumps function when mounted in a first circumferential direction on the wheel rim or a second opposite circumferential direction on the wheel rim.

According to another aspect of the pneumatic tire, a plurality of check valves maintain air flow in the pumps in a single direction.

According to still another aspect of the pneumatic tire, a check valve is adjacent each side of the control valve.

According to yet another aspect of the pneumatic tire, the control valve is disposed at an air let to the pumps.

According to still another aspect of the pneumatic tire, the control valve is disposed at an air outlet of the pumps into a tire cavity of the pneumatic tire.

According to yet another aspect of the pneumatic tire, the control valve is disposed in a bypass of the pumps.

According to still another aspect of the pneumatic tire, load on the pneumatic tire does not affect frequency of pumping action of the pumps.

According to yet another aspect of the pneumatic tire, the plurality of pumps includes 4 to 10 pumps and 4 to 10 pump holders configured circumferentially on a belt forming a loop and fitting circumferentially within a middle groove of the wheel rim.

According to still another aspect of the pneumatic tire, the control valve is shaped similarly to the pumps such that the control valve is placed in a space between the beginning and the end of the belt.

According to yet another aspect of the pneumatic tire, the pump holders have adjustable lengths that multiple sizes of wheel rim.

DETAILED DESCRIPTION OF DRAWINGS

The following drawings are illustrative of examples of the present invention.

DETAILED DESCRIPTION OF EXAMPLES OF THE PRESENT INVENTION

Figure 1:
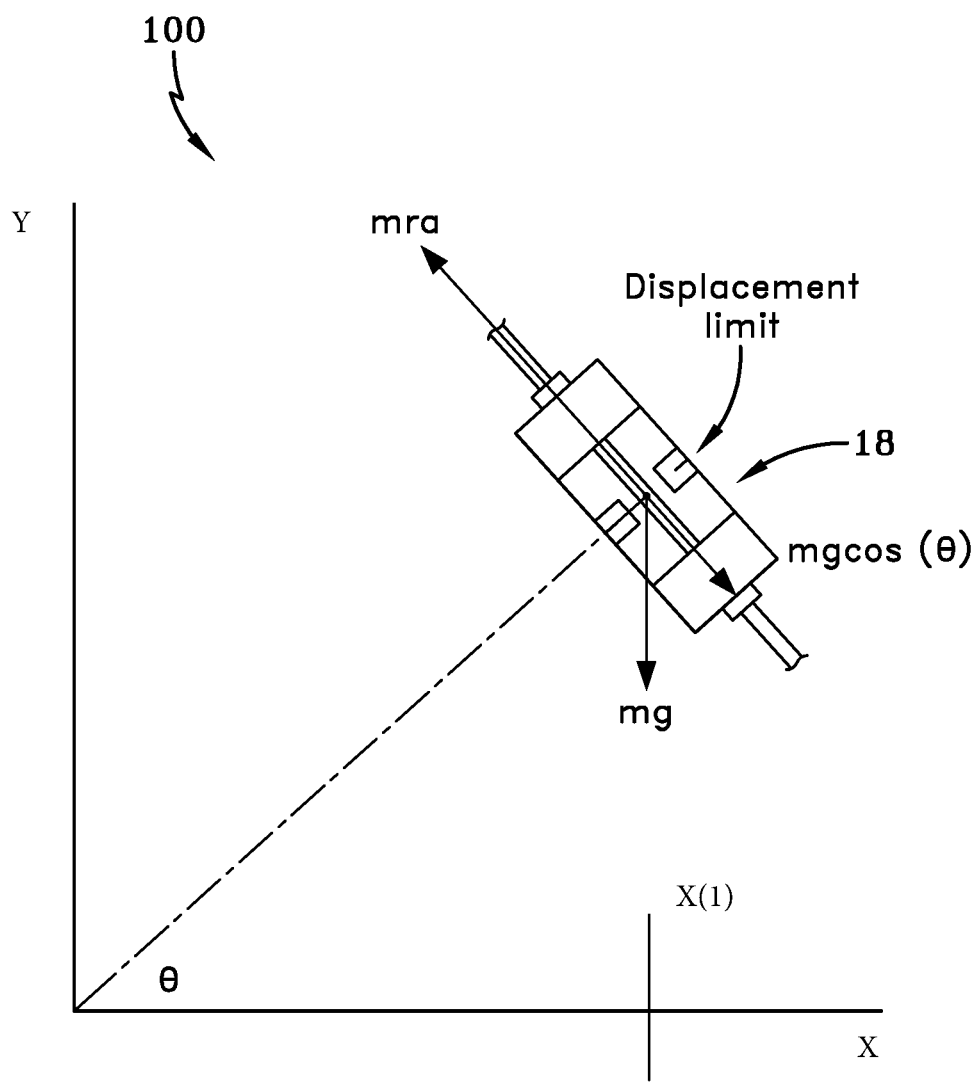
FIG. 1 is a schematic representation of part of a system in accordance with the present invention.
Figure 2:
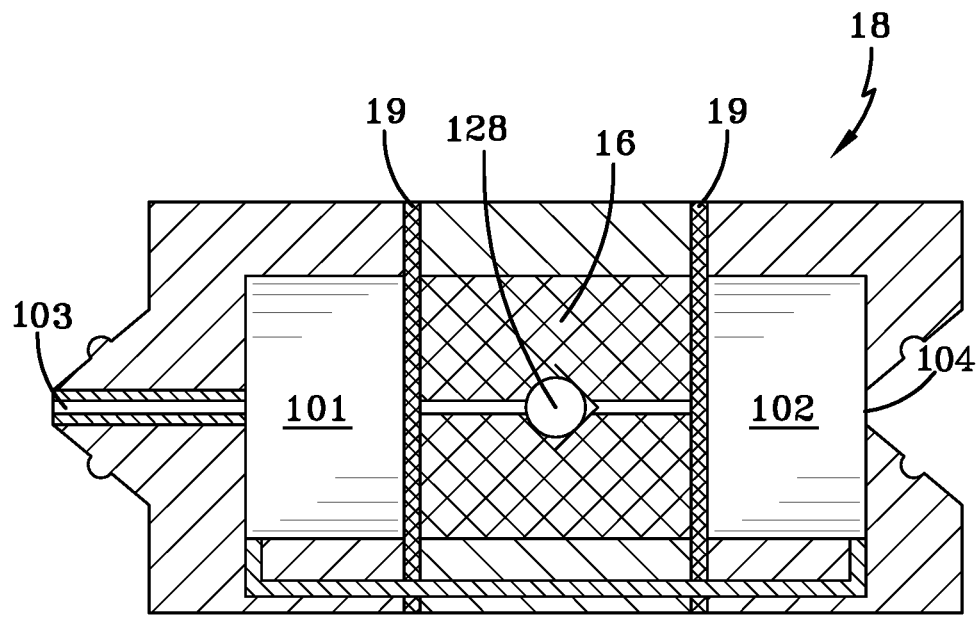
FIG. 2 is a schematic representation of part of a system for use with the present invention.
Figure 3:
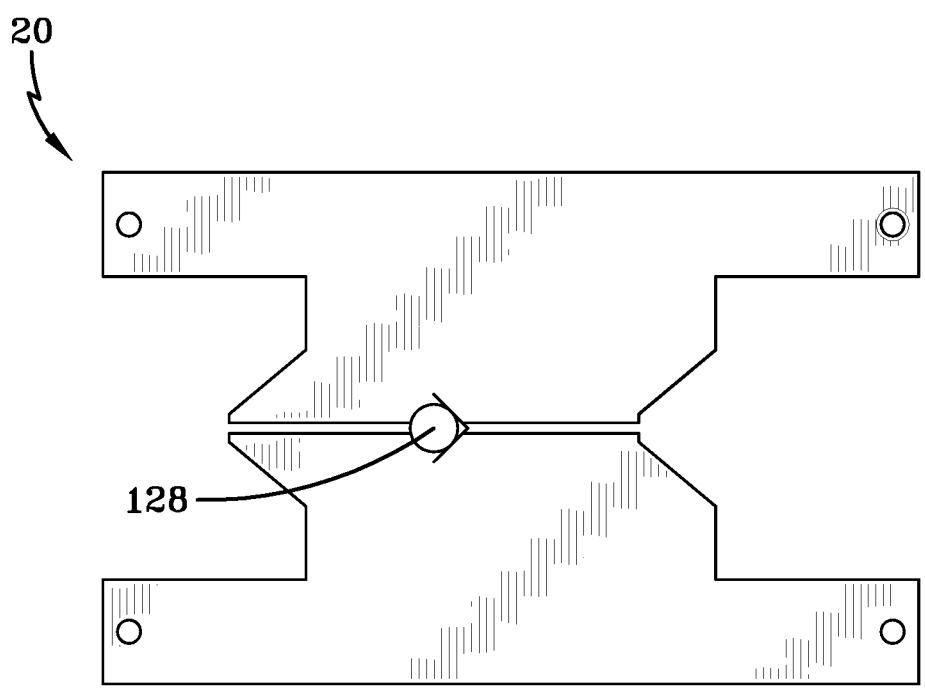
FIG. 3 is a schematic representation of another part of the system of FIG. 2.

As shown in FIGS. 2 through 8, an air maintenance tire system 10 for use with the present invention may provide a low profile and effective multi-chamber pump system that may easily mount inside of a wheel rim 12 with no significant modification to the wheel rim (minor modification may be required for air inlet having two stems). Further, the air maintenance tire 10 requires no significant changes to tire/wheel assembly or tire/wheel performance.

The air maintenance tire 10 may include a pumping mechanism, pump driving mechanism, or pump(s) 14, utilizing gravitational force changes during rotation of the air maintenance tire. The pump driving mechanism(s) 14 may include use of a mass of a piston body 16 moving against a pair of diaphragms 19 or an external mass (not shown) driving the piston body using a cam/gear system. If the mass of the piston body 16 is used, the pump driving mode may be based on force control. If a cam/gear system and external mass are used, gravitational force may drive gear rotation and convert this rotation to controllable displacement, as described in U.S. application Ser. No. 14/091,885, Air Maintenance Tire Assembly, herein incorporated by reference.

As the tire/wheel rotates, the piston body 16 may travel in a forward direction and an opposite backward direction per each revolution thereby producing a high pumping frequency. Thus, higher vehicle speed may provide higher pumping frequency. The parameters of the pumping action depend upon the mass and angular velocity of the tire/wheel assembly. Tire load or other external conditions may not effect pumping action.

Due to an amplification effect, the compression of the pump driving mechanism 14 may be defined as:

$$R=(r)^{2n}$$

where
R: system compression ratio
r: single chamber compression ratio
n: number of pump in the system Thus, a high compression ratio for each pump 18 is not necessary to achieve a high compression ratio (e.g., low force and/or deformation may produce high compression).

The pump driving mechanism 14 may include 4 to 10 pumps 18 and pump holders 20 may be configured linearly on a belt forming a loop and fitting circumferentially in a middle groove of the wheel rim 12 (radially innermost part of the wheel rim). A control valve 22 may be shaped similarly to the pumps 18 and may be placed in a space between the beginning and the end of the belt. Pump holders 20 may have adjustable lengths that fit any size of wheel rim 12.

Figure 4:
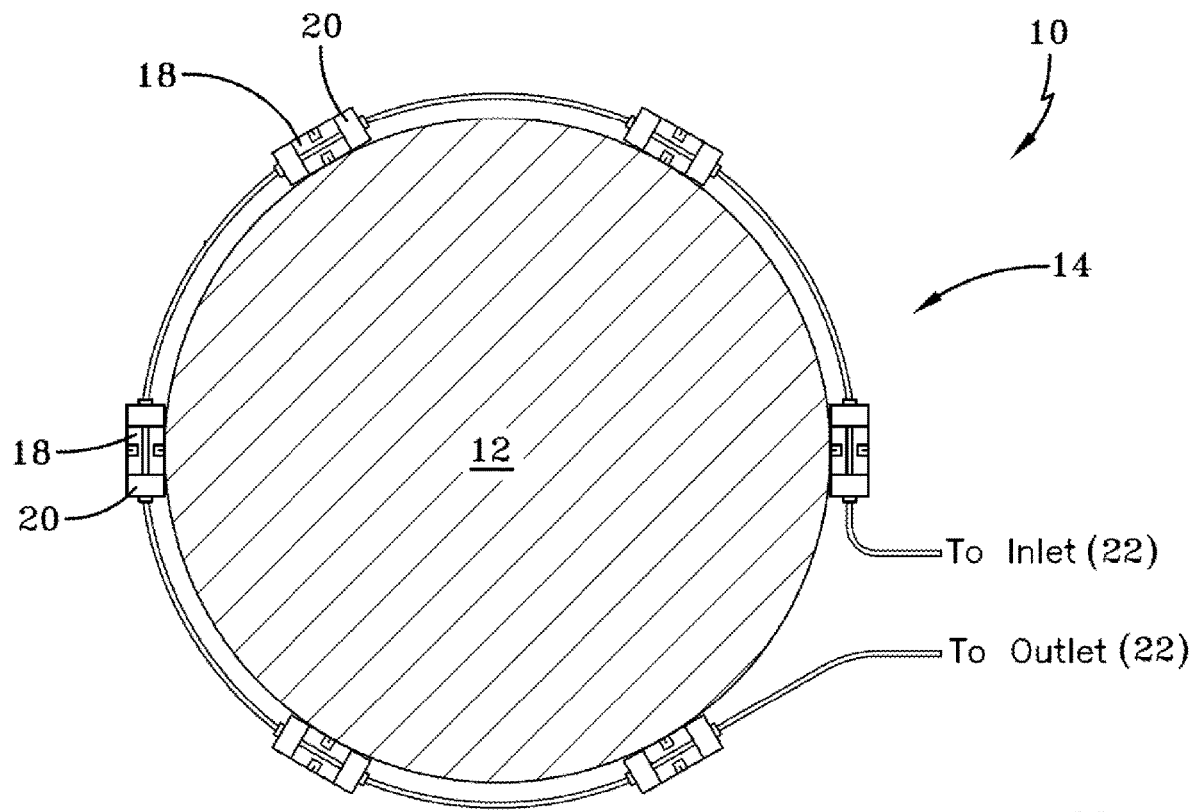
FIG. 4 is a schematic representation of another example system for use with the present invention.
Figure 5:
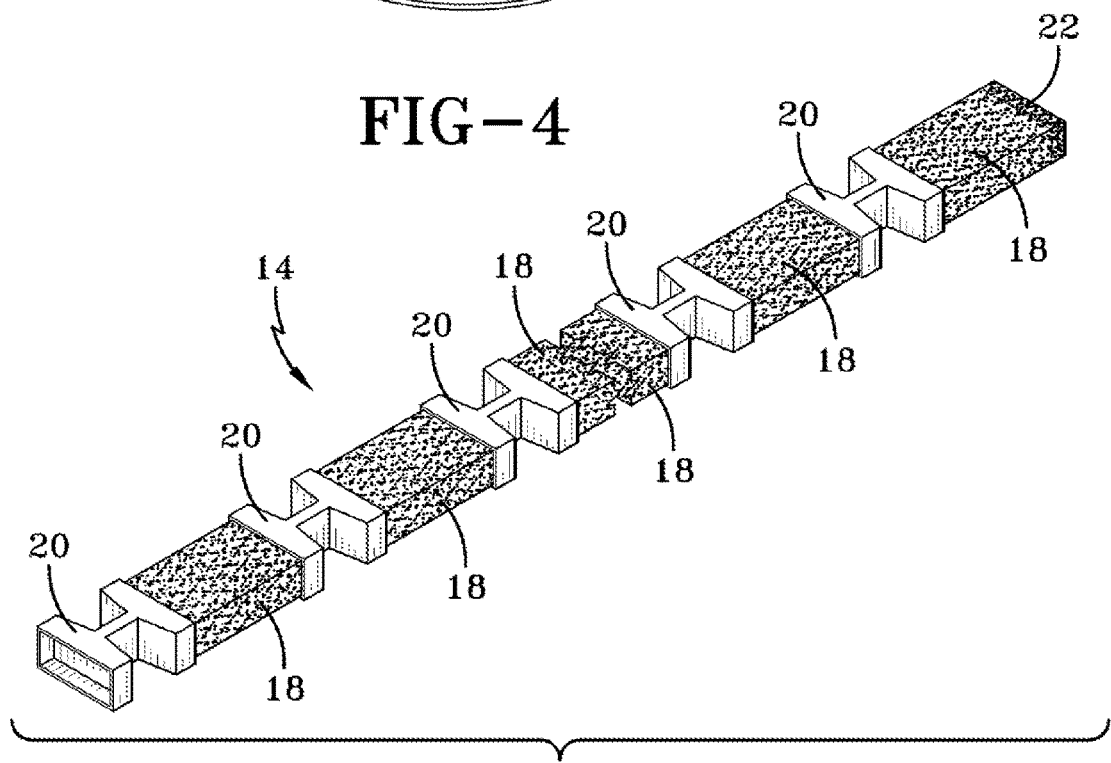
FIG. 5 is a schematic representation of part of the example system of FIG. 4.

A passage connection from a first valve stem to the control valve inlet port may be connected after the belt is secured to wheel rim 12 (FIG. 4). The control valve 22 may include a filter unit 30. The pump driving mechanism 14 may be bi-directional and mounted in either direction. The control valve 22 may include an adjustment for varying a set pressure for the tire cavity. The pump driving mechanism 14 thus may have a low profile around the wheel rim 12 that in no way interferes with tire mount/dismount and provides clearance in the tire cavity for impacts incurred (cleat or pothole) during driving of the vehicle. Further, the 360° design (FIG. 4) of the pump driving mechanism 14 may be a balanced construction in no way degrading the balance of the tire/wheel assembly.

Figure 6:
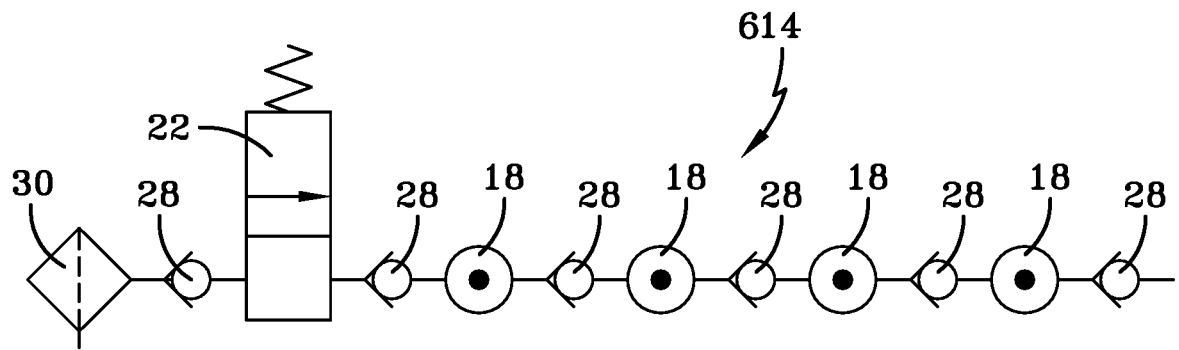
FIG. 6 is a schematic representation of part of still another example system for use with the present invention.

FIG. 6 shows of an example configuration 614 having four pumps 18, six check valves 28, a control valve 22, and a filter 30. This configuration may scale to n pumps 18 with the control valve 22 controlling air inlet into the configuration from outside of the tire 10. The check valve 28 to the left of the control valve 22 in FIG. 6 may be optional.

Figure 7:
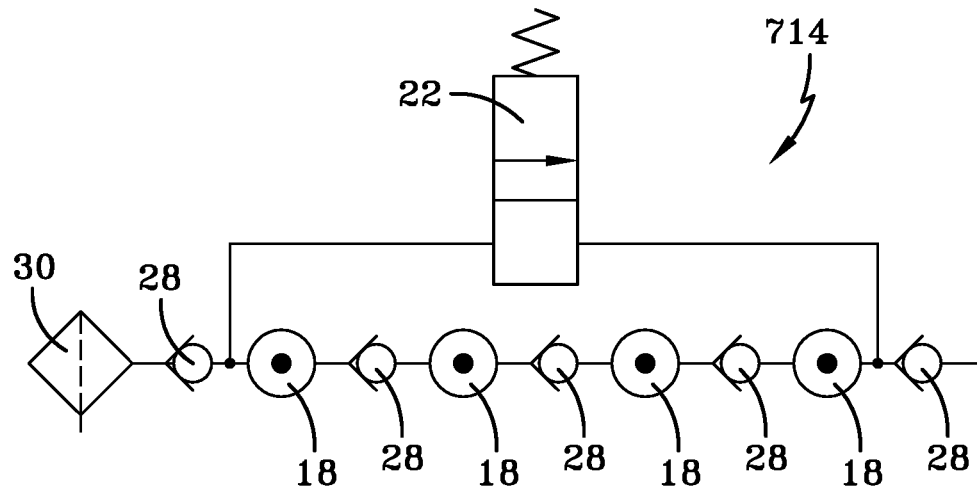
FIG. 7 is a schematic representation of another part of the example system of FIG. 6.

FIG. 7 shows of another example configuration 714 having four pumps 18, five check valves 28, a control valve 22, and a filter 30. This configuration may scale to n pumps 18 with the control valve 22 controlling air outlet from the configuration to the tire cavity. The control valve 22 may be placed in a bypass of the pumps 18.

Figure 8:
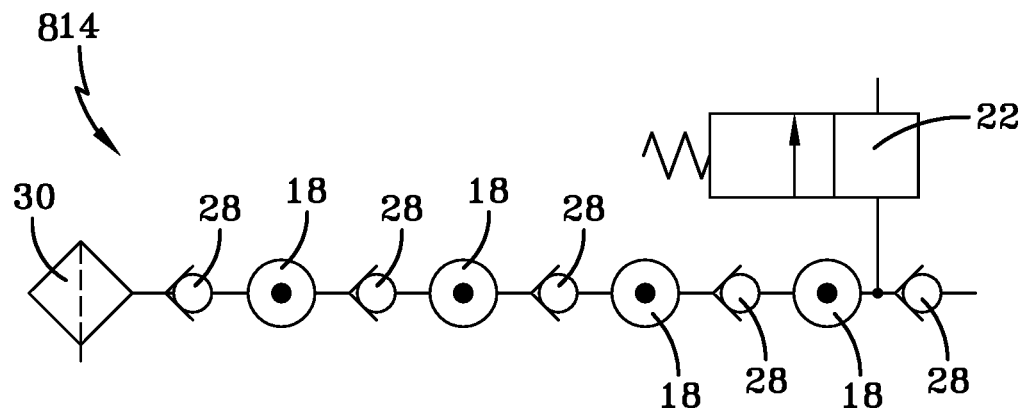
FIG. 8 is a schematic representation of still another part of the example system of FIG. 6.

FIG. 8 shows of still another example configuration 814 having four pumps 18, five six check valves 28, a control valve 22, and a filter 30. This configuration may scale to n pumps 18 with the control valve 22 controlling air outlet from the configuration to the tire cavity. The control valve 22 may be placed in series with the n pumps 18.

A pumping system, theory, or analytical model 100 in accordance with the present invention may define behavior of the multi-chamber pump system described above (FIGS. 2-8). Such a system may be converted to suitable computer codes as an analytical pumping model. This model may design and predict system performance under various configurations and conditions for both consumer and commercial air maintenance tire systems.

There may be "n" pumps spaced equally about the circumference of the wheel rim 12. Each pump 18 may include one piston 16 placed between two chambers 101, 102, as described above (FIG. 2). One chamber 101 may receive air from an inlet port 103 and the other chamber 102 may convey air to an air outlet port 104. The two chambers 101, 102 may be connected by a narrow passage having the one-way valve 128, or CV(i), with i=1 to n (FIGS. 4-8). CV(n+1) and CV(n+2) may be placed at the air inlet and outlet of the system 10, and between the pumps 18, CV(i), i=1 to n.

This system 100 (e.g., the air maintenance tire 10 described above) may be a force control system with a maximum pumping capability determined by the piston 16 moving a maximum distance to the right (FIG. 1), as limited by one of the diaphragms 19, $X(i)=Xo$ and $\Delta PA > m(r\alpha - g\cos\theta)$. The maximum pumping pressure may be $n\Delta P = n[m(r\alpha - g\cos\theta)]/A$ psig. For example, a 50 g piston with a 5.0 mm diameter for 6 pumps at a constant speed, ($\alpha = 0$), $\Delta P$ may be 21.74 psig. A 50 g piston with a 5.0 mm diameter for 6 pumps at a 5.0 g acceleration, $\Delta P$ may be 130.43 psig. If the resistance, or cracking pressure Pcr, of the check valve 128 is not negligible, the maximum pumping pressure $\Delta P$ may be $n(\Delta P - Pcr)$. Thus, this system 100 may be driven by two forces components, gravitation G and acceleration A. The gravitation force G may provide a high frequency cyclic effect on the pumps 18 in a short distance. The acceleration force A may provide a low or medium frequency cyclic effect to ensure maximum pumping pressure.

Figure 9A:
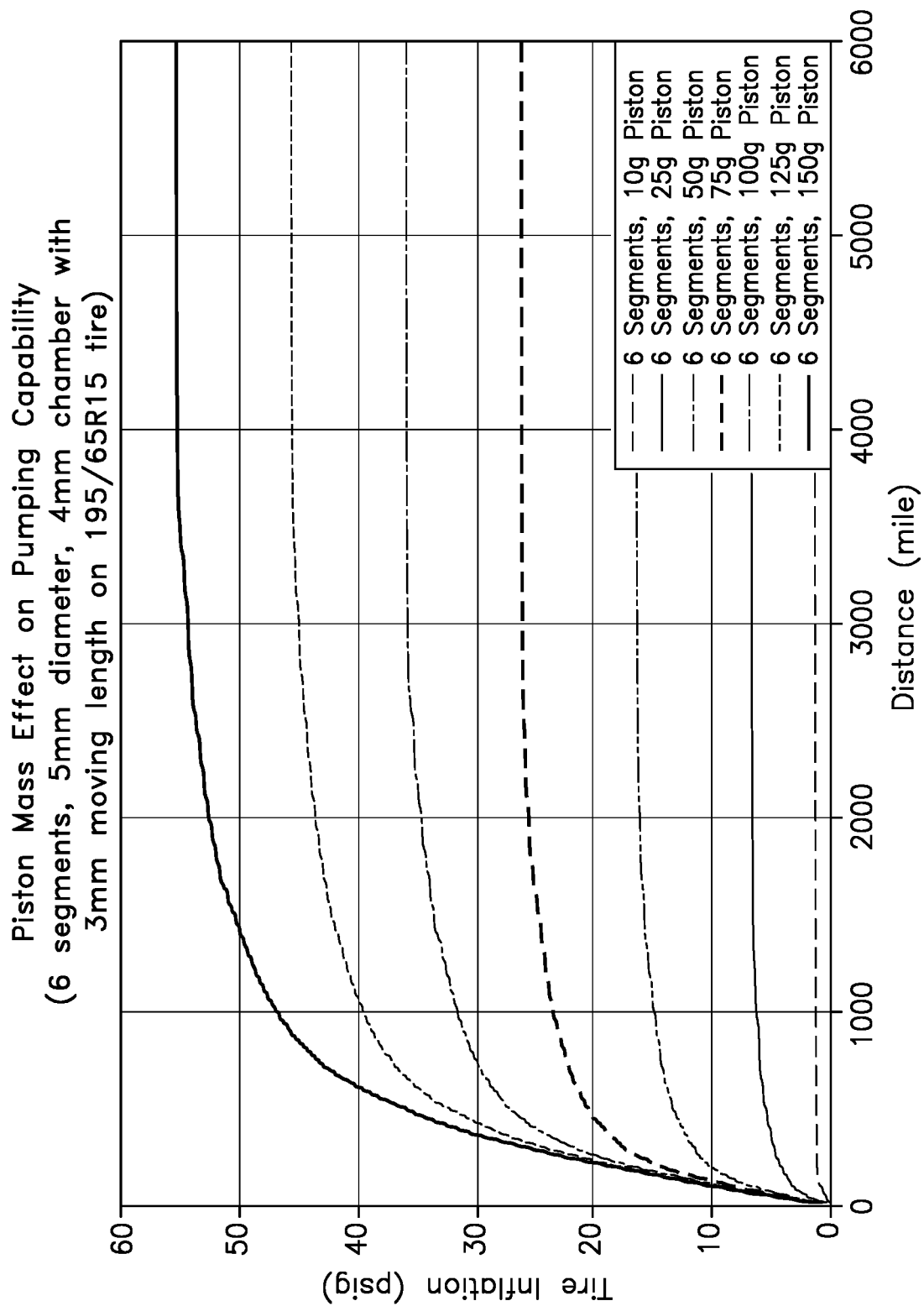
FIGS. 9A & 9B illustrate the piston mass effect on pumping capability and pumping pressure.
Figure 9B:
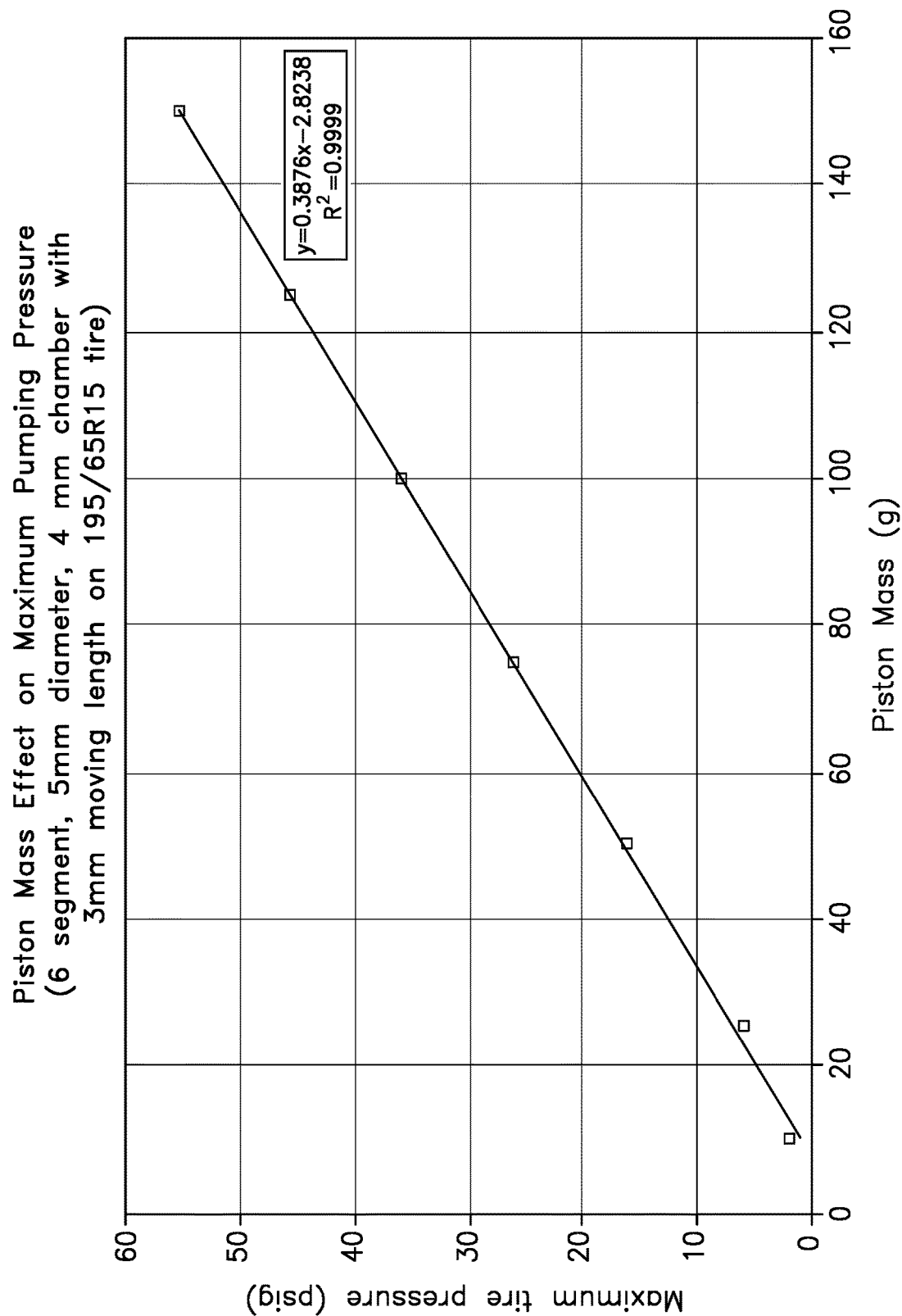
Figure 10A:
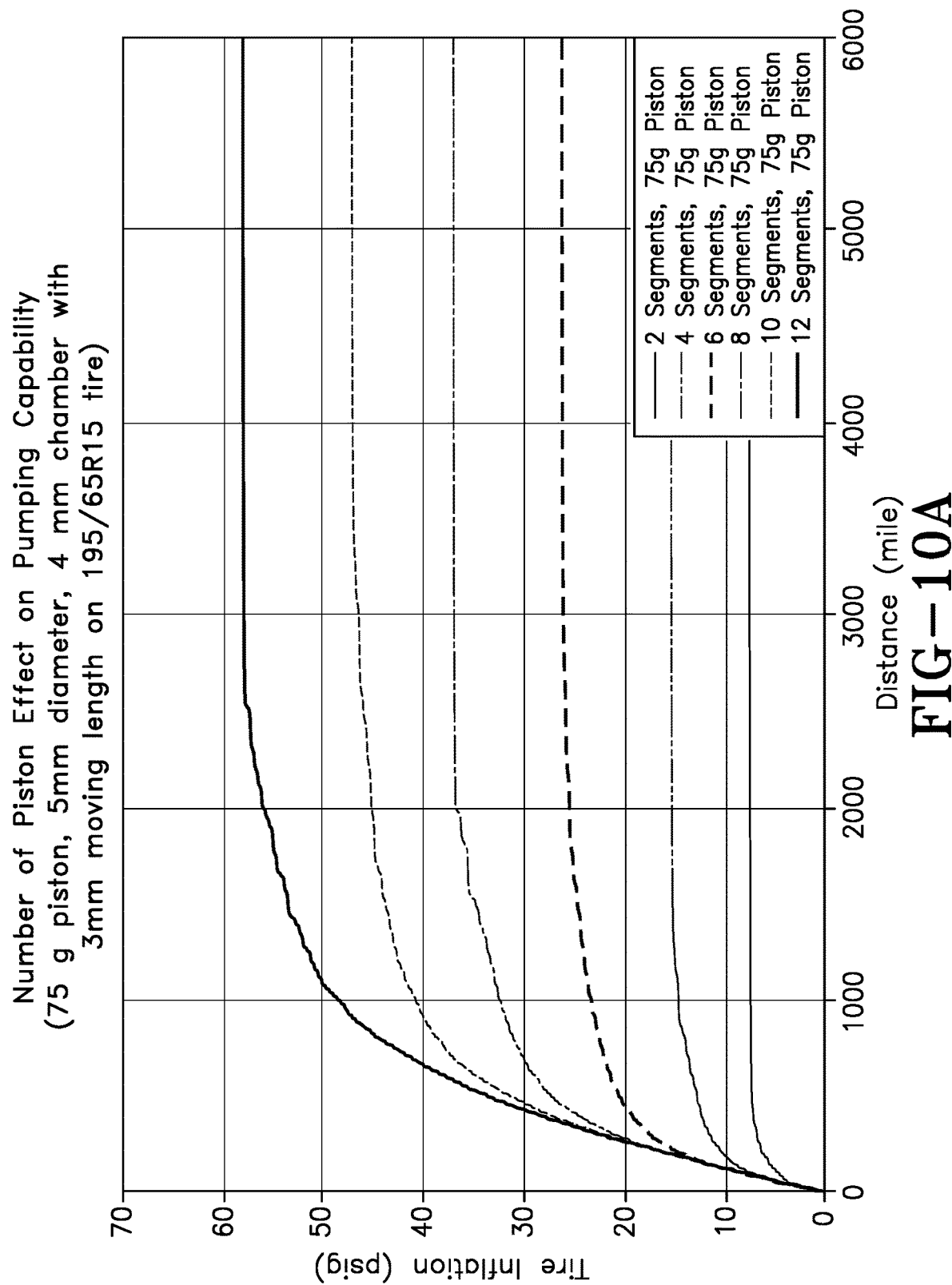
FIGS. 10A & 10B illustrate the number of pistons effect on pumping capability and pumping pressure.
Figure 10B:
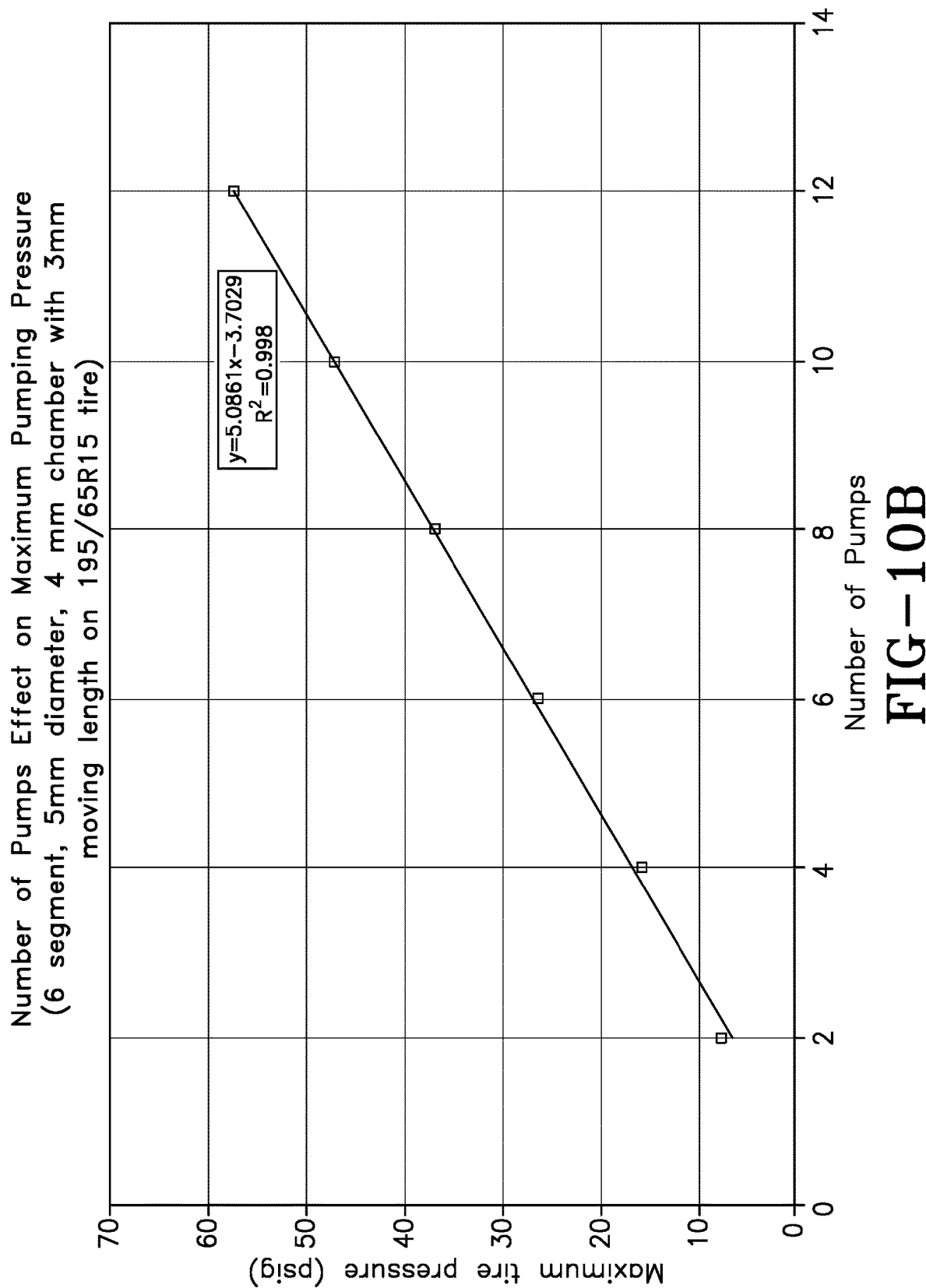

Under a first example condition, a piston mass effect under constant speed, 6 pumps with 5.0 mm piston diameters, 4.0 mm length chambers (e.g., 101, 102), and 3.0 mm maximum travel may be mounted on a 15" wheel/tire (FIGS. 9A & 9B). Under a second example condition, a number of piston effect under constant speed, 75.0 g pistons with 5.0 mm diameters, 4.0 mm length chambers (e.g., 101, 102), and 3.0 mm maximum travel may be mounted on a 15" wheel/tire (FIGS. 10A & 10B).

While certain representative examples and details have been shown for the purpose of illustrating the present invention, it will be apparent to those skilled in this art that various changes and modifications may be made therein without departing from the spirit or scope of the present invention.

What is claimed:

1. A system for use with a pneumatic tire mounted on a wheel rim to keep the pneumatic tire from becoming underinflated, the system comprising:
   a plurality of pumps attached circumferentially to the wheel rim, each pump having pump parameters, each pump including one piston;
   a primary check valve disposed adjacent each pump; and
   a control valve for controlling inlet air into a tire cavity of the pneumatic tire, the control valve having valve parameters, the system predicting system performance under various configurations and conditions through use of the pump parameters and the valve parameters,
   each pump including one piston placed between two chambers connected by a narrow passage having a secondary check valve.

2. The system as set forth in claim 1 wherein the plurality of pumps and the control valve define a multi-chamber pump configuration.

3. The system as set forth in claim 1 wherein the plurality of pumps define a force control system with a maximum pumping capability determined by the one piston of each pump moving a maximum distance within each pump.

4. The system as set forth in claim 1 wherein each pump includes a first diaphragm limiting motion of the one piston in a first direction and a second diaphragm limiting motion of the piston in a second opposite direction.

5. The system as set forth in claim 1 wherein the pump parameters include a piston mass parameter, a first piston travel parameter, and a second piston travel parameter.

6. A system for modeling a pneumatic tire mounted on a wheel rim and a pumping mechanism mounted on the wheel rim to keep the pneumatic tire from becoming underinflated, the system comprising:
   a plurality of pumps attached circumferentially to the wheel rim, each pump having pump parameters; and
   a control valve for controlling inlet air into a tire cavity of the pneumatic tire, the control valve having valve parameters, the system predicting system performance under various configurations and conditions through use of the pump parameters and the valve parameters,
   each pump including a first diaphragm limiting motion of a piston in a first direction and a second diaphragm limiting motion of the piston in a second opposite direction.

7. The system as set forth in claim 6 wherein the plurality of pumps and the control valve define a multi-chamber pump configuration.

8. The system as set forth in claim 6 wherein each pump includes one piston placed between two chambers.

9. The system as set forth in claim 8 wherein the two chambers are connected by a narrow passage having a check valve.

10. The system as set forth in claim 6 wherein the plurality of pumps define a force control system with a maximum pumping capability determined by a piston of each pump moving a maximum distance within each pump.

\* \* \* \* \*